United States Patent [19]

Lebrun et al.

[11] Patent Number: 4,656,300
[45] Date of Patent: Apr. 7, 1987

[54] PROCESS FOR A THERMAL TREATMENT OF A POLYSILAZANE CONTAINING ≡SIH GROUPS AND ≡SI—NH— GROUPS

[75] Inventors: Jean-Jacques Lebrun, Caluire; Hugues Porte, Lyons, both of France

[73] Assignee: Rhone Poulenc Specialites Chimiques, France

[21] Appl. No.: 878,261

[22] Filed: Jun. 25, 1986

[30] Foreign Application Priority Data

Jun. 26, 1985 [FR] France ................. 85 10034

[51] Int. Cl.⁴ .............................. C67F 7/10
[52] U.S. Cl. ................... 556/412; 528/28; 528/38; 423/324
[58] Field of Search ............ 556/412; 528/28, 38; 423/324

[56] References Cited

U.S. PATENT DOCUMENTS

| | | | |
|---|---|---|---|
| 4,340,619 | 7/1982 | Gaul | 528/38 X |
| 4,482,669 | 11/1984 | Seyferth et al. | 528/28 X |
| 4,482,689 | 11/1984 | Haluska | 528/38 X |
| 4,540,803 | 9/1985 | Cannady | 556/412 |

Primary Examiner—Paul F. Shaver
Attorney, Agent, or Firm—Finnegan, Henderson, Farabow, Garrett & Dunner

[57] ABSTRACT

A process for the thermal treatment of a polysilazane at a temperature from about 40° C. to 220° C. The polysilazane contains on average at least two, preferably at least three, ≡SiH groups per molecule and at least two

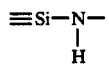

groups and, if appropriate, unsaturated aliphatic hydrocarbon groups bonded to the silicon atoms. The polysilazanes treated in this manner have good thermal behavior and can be used in particular as precursors of ceramic products with a high yield of inorganic products.

19 Claims, No Drawings

PROCESS FOR A THERMAL TREATMENT OF A POLYSILAZANE CONTAINING ≡SIH GROUPS AND ≡SI—NH— GROUPS

BACKGROUND OF THE INVENTION

The present invention relates to a process for the thermal treatment of a polysilazane and, more particularly, the treatment of a polysilazane containing ≡SiH groups and

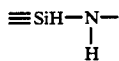

groups.

Organopolysilazanes, referred to as polysilazanes hereinafter, are well-known products that occur in the form of monomers, oligomers, cyclic or linear polymers, and resinous polymers. These polysilazanes can be prepared using a wide variety of methods from a wide range of starting materials.

Particularly, these polysilazanes can be shaped and pyrolyzed in the form of Si3N4, SiC or their mixtures. The silicon nitride can also be manufactured by reacting chlorosilanes, such as SiCl4, HSiCl3, and H2SiCl2, with ammonia at a high temperature and in a vapor phase. It is difficult to manufacture shaped articles, especially fibers, because this method directly yields a powdered product. In contrast, polysilazanes can also be spun into continuous fibers that yield ceramic fibers upon pyrolysis.

The polysilazanes can be shaped into films of various gauges and massive molded articles. They can also be used as binders for ceramic fiber or carbon fiber and as sintering binders for porous ceramic articles.

However, difficulties are encountered in converting these polysilazanes readily and economically into the form of fibers or coatings that, after pyrolysis, yield ceramic products in the form of fibers, films, coatings of various gauges and molded articles.

Japanese patent application No. 77/160,446 describes a process for the polymerization of an organopolysilazane of high molecular weight by using acidic earths as a catalyst for the treatment of the organopolysilazane. However, in this process, the solid catalyst needs to be separated off by filtration. This separation involves the use of a solvent in the case of polymers that can reach high viscosities.

One attempt to solve this problem was made in U.S. Pat. No. 3,853,567. This patent discloses a process that manufactures shaped articles, such as fibers, comprising silicon carbide, silicon nitride or mixtures thereof, and other ceramic products. The process carries out the first thermal treatment of a polysilazane at a temperature between 200° C. and 800° C. to obtain a meltable carbosilazane resin that can be melt-spun and then pyrolyzed at a temperature between 800° C. and 2000° C.

Although the process of this patent represents a significant step forward, it requires a first thermal treatment at a temperature that is very high, such as 200°-800° C. The weight yield of ceramic from this process is typically inadequate.

U.S. Pat. No. 3,892,583 describes a process for the preparation of shaped articles comprising a homogeneous mixture of silicon carbide and nitride. In this process, a polysilazane is prepared by reacting ammonia with a halosilane at a temperature ranging up to 200° C. to form the silazane. The article is then treated at a temperature between 200° C. and 800° C. This patent indicates that the thermal treatment makes it possible to obtain a product that is more highly crosslinked and has improved strength. Column 3, lines 13 to 19; and column 5, lines 5 to 13. However, there is no mention anywhere in this patent that, in order that the thermal treatment may be effective at a low temperature, that is to say at a temperature below 220° C., the polysilazane needs to contain on average at least two, preferably at least three, ≡SiH groups and at least two

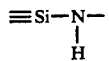

groups per molecule.

SUMMARY OF THE INVENTION

The purpose of the present invention is to solve the above problems and provide a simple, effective, economical and readily usable means for converting polysilazanes that, when pyrolyzed at a temperature from 1000° C. to 2000° C., can yield ceramic materials of excellent properties. The ceramic products can be in a wide variety of forms such as filaments, molded articles, coatings, films and the like.

Moreover, it is also desirable to have readily available a polysilazane that is sufficiently stable to hydrolysis and that yield a ceramic material in a high weight yield when pyrolyzed. For this purpose, it is intended that the polysilazane exhibit good thermal behavior during pyrolysis, while remaining integrally attached to the substrate to be coated and impregnated.

These and other objectives are attained by the present invention that provides a process for the treatment of a polysilazane, wherein a polysilazane is thermally treated at a temperature from about 40° C. to 220° C., preferably from about 100° C. to 220° C. The polysilazane comprises on average at least two ≡SiH groups and at least two

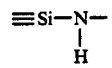

groups per molecule. Preferably, the polysilazane has at least three SiH groups per molecule. According to the invention, an SiH group is a group that bears only one hydrogen atom per silicon atom.

The above and other features and advantages of the present invention will be made more apparent from the following description of preferred embodiment.

DETAILED DESCRIPTION OF THE PREFERRED EMBODIMENTS

The present invention provides a process for the treatment of a polysilazane. In accordance with the present invention, at least one polysilazane is thermally treated at a temperature from 40° C. to 220° C. The polysilazane comprises on average at least two ≡SiH groups and at least two

groups per molecule.

The starting polysilazane (1) may additionally contain unsaturated aliphatic hydrocarbon groups, preferably vinyl groups, bonded to the silicon atoms. These unsaturated groups may be present in the starting polysilazane (1) or may be introduced by adding to this starting polysilazane (1) another polysilazane (2), which is free from ≡SiH groups but contains unsaturated aliphatic hydrocarbon groups bonded to the silicon atoms. Preferably, the polysilazane (1) or the mixture of polysilazanes (1) and (2) has an SiH/unsaturated aliphatic group molar ratio from about 0.5 to 5, preferably from 0.8 to 2.

The starting polysilazane (1) used in carrying out the process of the invention contains on average, at least two, preferably at least three ≡SiH units per molecule. The polysilazanes are preferably chosen from the units of formulae (Ia), (Ib), and (Ic):

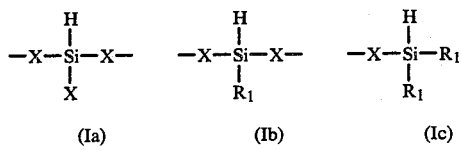

In formulae (Ia), (Ib), and (Ic), the radicals $R_1$, which may be identical or different, are chosen from a saturated or unsaturated aliphatic hydrocarbon radical, and an aryl, alkylaryl or arylalkyl radical.

In the polysilazanes (1), the units other than (Ia), (Ib) and (Ic) may be units chosen from the units of the formula (IIa), (IIb), (IIc), and (IId):

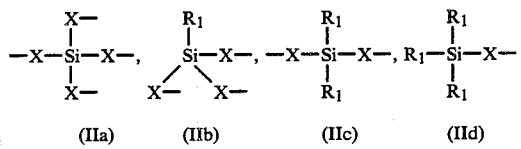

In formulae IIa, IIb, IIc, and IId, the radicals $R_1$, which may be the same or different, have the meanings given above for formulae (Ia), (Ib), and (Ic). The chain members X, which may be identical or different, are selected from $(CH_2)_n$ with n being an integer from 1 to 8, —Si—, and N—. Preferably, at least 50% of the X substituents are N—.

In the formulae (Ib), (Ic), (IIb), (IIc) and (IId), the radical $R_1$ may be a saturated aliphatic hydrocarbon radical, preferably containing from 1 to 8 carbon atoms, such as methyl, ethyl, propyl, butyl, pentyl, hexyl, heptyl and octyl radicals. The radical $R_1$ may also be a saturated cyclic hydrocarbon radical that contains from 3 to 7 carbon atoms, such as the cyclopropyl, cyclobutyl, cyclopentyl, cyclohexyl and cycloheptyl radicals. The radical $R_1$ may also be an arylalkyl radical such as the benzyl and phenylethyl radicals, or an alkylaryl radical such as the tolyl and xylyl radicals. Methyl and phenyl radicals are the preferred radicals.

When the starting polysilazane (1) does not contain any unsaturated aliphatic groups bonded to silicon atoms, it is possible, if appropriate, to add to the polysilazane (1) a polysilazane (2) containing on average at least two units per molecule, which are chosen from the units of formulae (IIIa), (IIIb) and (IIIc):

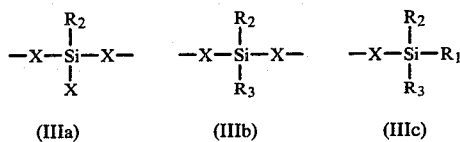

in formulae (IIIa), (IIIb), and (IIIc), $R_2$, which may be the same or different, denotes a hydrocarbon radical containing alkene or alkyne unsaturation. The radicals $R_3$, which may be identical or different, denote a radical that may be a radical, $R_1$, namely a saturated hydrocarbon radical, or an aryl, alkylaryl or arylalkyl radical. The X substituents, which may be identical or different, have the meaning given above.

In the polysilazanes (2), units of the formulae other than (IIIa), (IIIb) and (IIIc) include the units (IIa), (IIb), (IIc) and (IId) indicated above.

In the formulae (IIIa), (IIIb) and (IIIc), the radical $R_2$, which may be the same or different, may be an aliphatically unsaturated radical preferably containing from 2 to 8 carbon atoms. Examples of these radicals include ethynyl and propynyl radicals and the like, vinyl and allyl radicals and the like, and cycloalkenyl radicals such as cyclopentenyl, cyclohexenyl, cycloheptenyl and cyclooctenyl radicals. The vinyl radical is the preferred radical.

When all or some of the radicals $R_1$ in the polysilazane (1) are unsaturated aliphatic radicals, $R_1$ may have the same definition as $R_2$ which is indicated above.

Preferably X is chosen from N— and —Si— in the polysilazanes for use in the present process.

The above polysilazanes (1) and (2) are well-known products that are described in detail in the literature. For example, these polysilazanes may be obtained as a product of the reaction of at least organohalomonosilane of the formula:

$$R_aY_{4-a}Si$$

with an organic or oganosilicon compound to yield an

group after reaction with a chlorosilane. In the above formula, Y is a halogen, such as the chlorine atom. The radicals R, which may be identical or different, may have the definition of $R_1$, $R_2$ or $R_3$ above or may denote the hydrogen atom. In the formula, a is an integer from 0 to 3 inclusive. The organic or organosilicon compound may be, for example, ammonia, primary or secondary amines, silylamines, amides, hydrazines and the like.

Examples of organohalosilanes that can be used either alone or in combination in the preparation of the polysilazane include:
$(CH_3)_2SiCl_2$, $(CH_3)_3SiCl$, $CH_3SiCl_3$, $SiCl_4$, $(C_6H_5)_2SiCl_2$, $(C_6H_5)(CH_3)SiCl_2$, $C_6H_5SiCl_3$, $(CH_3)(CH_3CH_2)SiCl_2$, $CH_3HSiCl_2$, $(CH_3)_2HSiCl$, $HSiCl_3$, $CH_3(CH_2=CH)SiCl_2$, and $(CH_3)_2(CH_2=CH)SiCl$.

The following are examples of organic or organosilicon compounds containing at least one $NH_2$ or NH group that can be used in the synthesis of the above polysilazanes: ammonia, methylamine, ethylamine, cyclopropylamine, hydrazine, methylhydrazine, ethylenediamine, tetramethylenediamine, hexamethylenediamine, aniline, toluidine, guanidine, aminoguanidine, urea, hexamethyldisilazane, diphenyltetramethyldisilazane, tetraphenyldimethyldisilazane, tetramethyldivinyldisilazane, dimethyldiphenyldivinyldisilazane and tetramethyldisilazane.

The starting polysilazanes prepared from ammonia are generally referred to as ammonolysates and the starting polysilazanes prepared from an amino compound, as indicated above, generally are referred to as aminolysates, which also include the ammonolysates. More particularly, the polysilazanes (1) containing units of both formulae (Ib) and (IIIb) may be produced by coammonolysis of the following silanes: $CH_3SiCl_3$, $(CH_3)_2SiCl_2$, $CH_3HSiCl_2$, and $CH_3-(CH_2=CH)SiCl_2$.

As a cyclic or linear polysilazane (1) containing units of formula (Ib), there may be used polysilazanes of the formula:

$$-(R_1SiHNH)_n-$$

In the above formula, n is a number greater than or equal to 3 and is generally from 3 to 100. The preparation of these polysilazanes by ammonolysis of $R_1SiHCl_2$ is described in detail by S. D. Brower and C. P. Haber, 70 *J. Am. Chem. Soc.* 3888–91 (1948); K. A. Andrianov et al., 176 *Dokl. Akad. Nauk. SSSR* 85 (1967); British Pat. No. GB-A 881,178; and U.S. Pat. No. 4,482,669.

The polysilazanes (1) and (2) may be resinous polymers consisting of units chosen from those of the formulae: $R_3SiNH_{0.5}$, $R_2SiNH$, $RSiNH_{1.5}$ and $Si(NH)_2$. In these formulae, R has the meaning given above for $R_1$, $R_2$, $R_3$. These resinous polymers are advantageously prepared by bringing the corresponding organochlorosilanes or mixtures of these silanes into contact with ammonia in an organic solvent medium, if appropriate. For example, see French Pat. Nos. FR-A 1,379,243, 1,392,853 and 1,393,728.

These resinous polysilazanes contain a predominant number of Si—NH—Si bonds and a smaller number of $SiNH_2$ or $N(Si\equiv)_3$ bonds. In addition to the crosslinked polymers, these polysilazanes sometimes contain linear or cyclic polymers with the latter being capable of being produced only when diorganodichlorosilanes are also present among the starting organochlorosilanes.

The process according to the invention may be carried out at a temperature from 40° to 220° C. for a period which is generally from 1 minute to 24 hours. Preferably, the temperature is from 100° C. to 220° C.

The operation is preferably carried out at atmospheric pressure under an inert atmosphere. However, pressures that are higher or lower than atmospheric pressure are not excluded.

In a wholly unexpected manner, the process of the invention makes it possible, on the one hand, to incorporate the volatiles into the macromolecules of the aminolysate and, on the other hand, in the presence of trifunctional silicon-containing units, to rearrange and to supercrosslink the aminolysate lattice. In this rearrangement or crosslinkage, the lattice is more stable thermally during the pyrolysis.

Another highly important advantage stemming from the thermal treatment according to the invention is the production of a treated aminolysate that is more resistant to oxygen and atmospheric moisture.

In the coating, film, and thin layer applications, the treated organopolysilazane composition according to the invention is preferably used without a solvent. In this case, a viscosity of from 10 mPa s to 5000 mPa s at 25° C., preferably from 100 mPa s to 1000 mPa s, is chosen.

Higher viscosities may be used. However, when the the compositions are to be used for coating or impregnating a substrate, the composition should be dissolved in an organic solvent that is compatible with the polysilazanes, such as benzene, toluene, hexane, cyclohexane, isopropyl ether, ethyl ether, dichloromethane and chlorobenzene.

In fiber applications, viscosities above 5000 mPa s should be used. In these operations, the reaction may be carried out without any solvent, in the molten state or in solution. The crosslinking is produced at the exit of the die by passage through an oven and/or under irradiation, such as UV or electron beams.

The polysilazane compositions according to the invention may additionally contain fillers, preferably chosen from $SiO_2$, $Si_3N_4$, SiC, BN, $B_2O_3$, $B_4C$, AlN, $Al_2O_3$, $Al_4C_3$, TiN, $TiO_2$, TiC, $ZrO_2$, ZrC, $VO_2$, and the like. The polysilazane compositions according to the invention may also be used as a matrix for ceramic fibers made, in particular, of SiC, $SiO_2$, $Si_3N_4$, $B_4C$ and the like.

The polysilazane composition according to the invention is especially useful for coating or impregnating rigid or flexible metal or ceramic fibers substrates. The substrates that are covered or impregnated with the cured composition or the fibers may be immediately or subsequently subjected to a pyrolysis treatment. This pyrolysis preferably occurs under vacuum, under pressure, or under an inert atmosphere at a temperature ranging from the crosslinking temperature to 1500°–2000° C., depending on the required nature of the ceramic or the binder.

The composition according to the invention consequently makes it possible to produce intermediate semi-finished products that can be stored in the open air and subsequently pyrolysed. Thus, this constitutes a particularly advantageous process for depositing or impregnating a ceramic material onto a substrate and for producing ceramic fibers or sintering binders.

In the following examples, which illustrate the invention without limiting its scope, the polysilazanes obtained, whether treated catalytically or not, are analyzed by dynamic thermogravimetric analysis (TGA). The polysilazanes are pyrolyzed at temperatures ranging from ambient temperature (20° C.) to 1400° C. under nitrogen at a rate of temperature rise of 2° C./minute. The TGA yield (% by weight of solid residue at 1300°–1500° C.) is indicated in the examples.

In the examples, the viscosity is measured at 25° C. and is given in mPa s. Furthermore, in the formulae, Me=$CH_3$ and Vi equals $CH_2=CH$. The ammonolysis and coammonolysis reactions are carried out in a first three-liter, cylindrical reactor I, which is equipped with a jacket for cooling the reaction space. A gas condenser is mounted above the reactor. Mechanical stirring is provided by two Rushton ® turbines arranged along the stirrer shaft, one turbine has straight blades and one turbine has inclined blades.

$N_2$ and $NH_3$ gases are introduced by means of a narrow tube immersed in the solution so that $NH_3$ is produced just below the first turbine stirrer. When ammonolysis is complete, the reaction mixture is drained off and is introduced into a second reactor II equipped with mechanical stirring (a Rushton ® turbine having straight blades) and a filter bed having a mean porosity of 10 μm.

The ammonolysates are filtered. The solvent washes are then introduced into a third, six-liter reactor III equipped with a jacket and mechanical stirring by means of a straight-bladed Rushton ® turbine, in which the solvent distillation is carried out.

The entire unit is filled with an inert atmosphere several hours before the handling. The entire reaction, ammonolysis, filtration, and solvent evaporation takes place under dry nitrogen. The products obtained are placed in leakproof flasks blanketed with nitrogen and are stored, weighed, and handled in a nitrogen-blanketed glove box.

Chemical determination of the SiH groups is performed by reaction with 5% by weight of potassium hydroxide in butanol. A quantity of hydrogen, which is measured by gasometry and is proportional to the quantity of SiH present in the specimen, is released. In comparison, a specimen of $D_3N$ (hexamethylcyclotrisilazane) that contains no SiH unit, does not give rise to any evolution of hydrogen within the time and temperature ranges required for the measurement (20° C. for 15 minutes). This measurement establishes that potassium hydroxide does not react with the hydrogens bonded to the nitrogen. The results of the chemical method, which is simple to use, are consistent with the results of semi-quantitative spectroscopic methods such as $^1$H NMR, $^{29}$Si NMR, and IR.

In addition, the nomenclature used in the following examples is:

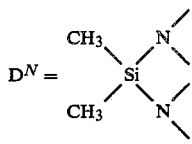

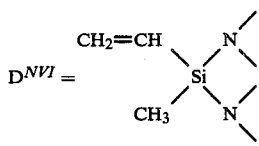

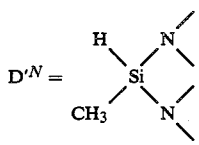

Unless stated otherwise, the percentages shown in the following are by weight.

The following are illustrative examples of the present invention. It is understood, however, that the invention is not to be limited to the specific conditions or details set forth in these examples.

EXAMPLE 1

207.5 of $CH_3HSiCl_2$ (1.8 mole) of 99% purity are placed in the reactor I in the presence of 1.2 liters of isopropyl ether. Ammonia is introduced into the reactor I at a rate of 6 cm$^3$/s, together with $N_2$ at a rate of 3 cm$^3$/s for 7 hours 30 minutes. Approximately 7 moles of $NH_3$ are introduced. The temperature of the reactor I is maintained at 2° C. during the addition of $NH_3$ for 6 hours and is raised to 20° C., with the $NH_3$ still being added for 1 hour 30 minutes. The ammonium chloride removed is dried under vacuum and weighed to be 188 g compared with a theoretical weight of 192.6 g.

After removal of the solvent under a vacuum of 25 mbar at 60° C., followed by 1.5 mbar at 60° C. for 1 hour, 84 g of a clear, low-viscosity liquid are recovered. The weight yield of the reaction is 79%.

The recovered solvents are analyzed by gas phase chromatography to identify and quantify the proportion of volatiles removed during the devolatilization of the product.

The product itself is analyzed by IR, $^{29}$Si NMR and $^1$H proton NMR (360 MHz NMR in $C_6D_6$): $\delta=0.1$–$0.4$ ppm (broad: $SiCH_3$), $\delta=0.6$ to 1.5 ppm (broad: NH), $\delta=4.1$ ppm (broad: SiH), $\delta=4.5$–$4.7$ ppm (broad: SiH), $\delta=4.8$–$5.0$ ppm (broad: SiH).

Liquid chromatography analysis indicates the presence of several low molecular weight products estimated at between 300 and 450 g. Quantitative chemical analysis of the product indicates a hydrogen content in the product of 1.66% as opposed to a theoretical yield of 1.70%. This result is consistent with the results given by spectroscopic methods.

EXAMPLE 2

203 g of $MeViSiCl_2$ (1.44 mole) of 99% purity in 1.3 liters of isopropyl ether are ammonolysed using the process described in Example 1. The $NH_3$ flow rate is 6 cm$^3$/s. The reaction takes 6 hours 30 minutes at 2° C. with 6.1 moles of $NH_3$ being introduced. 119 g of polysilazane are recovered as a clear oil with a viscosity of 3 mPa s. The weight reaction yield is 97%.

The product is analyzed by IR, proton NMR, $^{29}$Si NMR, and gas phase chromatography. It consists chiefly of two cyclic products:

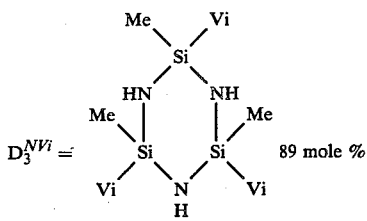

and

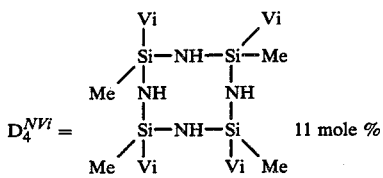

Vi equals $CH_2=CH$; $Me=CH_3$

EXAMPLE 3

The coammonolysis in accordance with the process of Example 1 is performed with:
107.2 g of $CH_3SiCl_3$ (0.72 mole);
46.25 g of $(CH_3)_2SiCl_2$ (0.36 mole); and
41.4 g of $CH_3HSiCl_2$ (0.36 mole)

in a solvent medium of 1.3 liters isopropyl ether. The reaction is carried out at 2° C. with an NH3 flow rate of 6 cm³/s for 7 hours so as to use 6.6 moles of NH3.

81.3 g of a viscous liquid with a viscosity of 1,100 mPa s is recovered. The weight yield of the coammonolysis is 86.2%.

Quantitative chemical analysis of the SiH groups is 0.37% compared to a theoretical yield of 0.38%.

EXAMPLE 4

The coammonolysis in accordance with the process of Example 1 is performed with:
107.2 g of CH3SiCl3 (0.72 mole);
46.25 g of (CH3)2SiCl2 (0.36 mole); and
50.76 g of CH3(CH2=CH)SiCl2 (0.36 mole).

The operation is carried out in the presence of 1.3 liters of isopropyl ether. The reaction takes place at 2° C. with an NH3 flow rate of 6 cm³/s for 6 hours 45 minutes. 98.7 g of a viscous oil with a viscosity of 110 mPa s are recovered. The weight yield from the coammonolysis is 95%.

The product is identified by $^{29}$Si NMR, proton NMR and IR. The composition corresponds well to that of the materials tested having the $T^N/D^N=2$ and $D^{NVi}/D^N=1$.

EXAMPLE 5

In this example, a mixture of polysilazanes is used.

The mixture consists of 1,325 g of the ammonolysate of MeHSiCl2 prepared in Example 1 and 4,325 g of the coammonolysate of MeSiCl3, Me2SiCl2, MeViSiCl2 (0.50/0.25/0.25), prepared in Example 4, corresponding to a $\equiv$SiH/$\equiv$SiVi molar ratio of 1.46. Both these products are dissolved in toluene containing about 20% by weight of the polysilazane. After mixing, a hank of glass fibers is impregnated to evaluate the acquisition of mechanical properties by the crosslinked material.

1. Analysis of mechanical properties:

A fiber torsional pendulum is used for this purpose. In this measurement, a hank of glass fibers (approximately 3000 fibers) is impregnated with the solution of polysilazanes as prepared above. After evaporation and drying of the composite under a vacuum at a temperature of 50° C., the period and the amplitude of the swings of the pendulum are measured as a function of temperature or time according to the method described by B. Hartmann and G. F. Lee, 21 *Journal of Applied Polymer Science*, 1341 (1977).

The period (p) is related to the relative rigidity (RR) of the specimen (RR=1/p²), which is itself proportional to the elasticity modulus $G'=(8\,LI \cdot RR)/r^4$. L, r and I are respectively the length, the radius, and the moment of inertia of the specimen.

The amplitude of the swings gives the damping curved and the variation of the loss modulus ($\Delta$) as a function of temperature:

$$\Delta = \frac{1}{n} \log \frac{A_r}{A_{r+n}}$$

In this formula, $A_r$ is the amplitude of the reference peak, and $A_{r+n}$ is the amplitude of the peak after n cycles.

The analysis comprises three successive stages once the fiber has been impregnated with the mixture of polysilazanes and dried under vacuum. In the first stage, the temperature rises from $-160°$ C. to 180° C. (subsequent crosslinking temperature) with a $\Delta T/\Delta t$ of approximately 1.5° C./min. In the second stage, the crosslinking of the resin isothermally occurs at 180° C. for 12 hours. In the third stage, there is slow cooling to $-160°$ C. and a second temperature rise up to 400° C. with $\Delta T/\Delta t = 1.5°$ C./min.

Table I below shows the values of the relative rigidity RR of the composite minus the rigidity of the fibers by themselves as a function of the crosslinking time at 180° C. In this example, the onset of crosslinking, which can be observed with the fiber torsional pendulum, occurs at 130° C.

TABLE I

| Time in min. | 0(1)* | 0(2)** | 10 | 60 | 100 | 140 | 180 | 220 | 300 | 400 | 500 | 600 | 700 |
|---|---|---|---|---|---|---|---|---|---|---|---|---|---|
| $\Delta RR \times 10^2$ | 0.15 | 0.45 | 0.85 | 1.55 | 2.25 | 2.60 | 2.85 | 3.10 | 3.45 | 3.80 | 4.15 | 4.40 | 4.55 |

*0(1) = $\Delta RR$ at 130° C. before crosslinking;
**0(2) = $\Delta RR$ at 180° C. after a dynamic rise from 130° C. to 180° C. in about 40 minutes.

EXAMPLE 6

A 20% strength solution in toluene is prepared using the ammonolysate of MeViSiCl2 of Example 2 and the coammonolysate of MeSiCl3/Me2SiCl2/MeHSiCl2 (0.5/0.25/0.25) of Example 3. The kinetics of the crosslinking of this mixture occurs at 180° C. are followed by means of the fiber torsional pendulum, as described in Example 5.

The onset of crosslinking is at 175° C. The relative rigidities obtained under isothermal conditions are shown in Table II below:

TABLE II

| Time in min. | 0(1)* | 0(2)** | 10 | 60 | 100 | 140 | 180 | 220 | 300 | 400 | 500 | 600 | 700 |
|---|---|---|---|---|---|---|---|---|---|---|---|---|---|
| $\Delta RR \times 10^2$ | 0.15 | 0.20 | 0.40 | 1.20 | 1.75 | 2.15 | 2.60 | 2.80 | 3.20 | 3.60 | 3.90 | 4.15 | 4.40 |

*0(1) = $\Delta RR$ at 175° C. before crosslinking;
**0(2) = $\Delta RR$ at 180° C. after a dynamic rise in temperature from 175° C. to 180° C. for approximately 4 minutes.

EXAMPLE 7

A 20% strength solution in toluene is prepared using the coammonolysate of MeSiCl3/MeHSiCl2/Me2—SiCl2 (0.5/0.25/0.25). The kinetics of the crosslinking of this product at 180° C. are followed using the fiber torsional pendulum as described in Example 5. The onset of crosslinking takes place at 180° C. The relative rigidities obtained under isothermal conditions are collated in Table III below:

TABLE III

| Time | 0(1)* | 10 | 60 | 100 | 140 | 180 | 220 | 300 | 400 | 500 | 600 | 700 | 1100 |
|---|---|---|---|---|---|---|---|---|---|---|---|---|---|

TABLE III-continued

| in min. | | | | | | | | | | | | |
|---|---|---|---|---|---|---|---|---|---|---|---|---|
| ΔRR × 10² | 0.05 | 0.18 | 0.80 | 1.25 | 1.55 | 1.75 | 1.95 | 2.30 | 2.80 | 3.15 | 3.55 | 3.90 | 4.50 |

*0(1) = ΔRR at 180° C. before crosslinking

EXAMPLE 8

In this comparative example, the composition contains radicals Me and radicals Vi without ≡SiH.

A 20% strength solution in toluene is prepared using the coammonolysate of MeSiCl₃/MeViSiCl₂/Me₂—SiCl₂(0.5/0.25/0.25) of Example 4. The Kinetics of the crosslinking of this product are followed using the fiber torsional pendulum at 180° C., as described in Example 5.

It is found that the rigidity of the product shows practically no change during the twelve hours of thermal treatment, as shown in Table IV below;

TABLE IV

| Time in min. | 0 | 10 | 60 | 100 | 140 | 180 | 220 | 300 | 400 | 500 | 600 | 700 |
|---|---|---|---|---|---|---|---|---|---|---|---|---|
| ΔRR × 10² | 0.10 | 0.10 | 0.10 | 0.10 | 0.10 | 0.10 | 0.10 | 0.10 | 0.15 | 0.15 | 0.20 | 0.25 |

During a second run, a very marked crosslinking is recorded at T=240° C. The A/T is 320° C. after 65 minutes of temperature rise with the ΔRR×10² being 3.40. This value reaches a maximum value of 5.50 at 400° C. after 130 minutes of temperature rise after the onset of crosslinking. Thermal crosslinking is accompanied by a considerable release of NH₃.

EXAMPLE 9

In this comparative example, the composition contains only methyl radicals.

A 20% strength solution of toluene is prepared using a coammonolysate of MeSiCl₃/Me₂SiCl₂ (0.50/0.50) and the kinetics of its crosslinking are followed using the fiber torsional pendulum at 180° C. as described in Example 5.

As in Example 8, the relative rigidity shows no change with time, as shown in Table V below. This demonstrates the absence of product crosslinking.

TABLE V

| Time in min. | 0 | 10 | 60 | 100 | 140 | 180 | 220 | 300 | 400 | 500 | 600 | 700 |
|---|---|---|---|---|---|---|---|---|---|---|---|---|
| ΔRR × 10² | 0.15 | 0.15 | 0.15 | 0.15 | 0.15 | 0.20 | 0.20 | 0.20 | 0.20 | 0.20 | 0.25 | 0.25 |

During a second run, a clearly marked crosslinking is recorded at T=240° C. with a release of NH₃. At T=320° C. after 65 minutes of crosslinking with a temperature rise, the ΔRR×10² is 1.2 and reaches a maximum value of 7.0 at 400° C. after 130 minutes of crosslinking with a temperature rise. This thermal crosslinking is accompanied by a considerable release of NH₃.

EXAMPLE 10

In this example, a mixture of polysilazanes is used consisting of 1,325 g of an ammonolysate of MeHSiCl₂ (Example 1) and 4,325 g of the coammonolysate of MeSiCl₃, Me₂SiCl₂ and MeViSiCl₂ in a molar ratio of 0.50/0.25/0.25 (Example 4), which corresponds to a molar ratio (SiH/SiVi) of 1.46.

The mixture is analyzed by TGA and gives a 49% yield of inorganic product.

EXAMPLE 11

The same mixture as that used in Example 10 is heated for 24 hours at 170° C. in a hermetically closed reactor capable of withstanding a pressure of 10 bars. The TGA analysis of the product obtained gives a 64% yield of inorganic product.

As shown by these examples, the presence of ≡SiH and

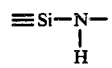

groups in the starting polysilazane is critical to obtaining the objectives of the present invention. It is believed that the presence of these ≡SiH and

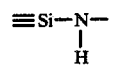

groups renders the reactions involved in the present invention different from previous reactions.

More specifically, according to the teaching of U.S. Pat. No. 3,892,583, the reactions involved in that process are the following:

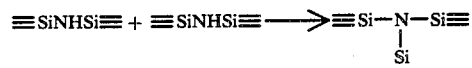

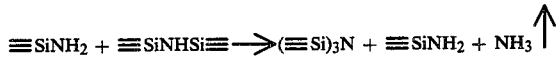

that is,

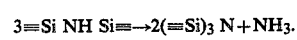

According to the process of the present invention, it is believed that the reactions involved are:

(1) in the absence of unsaturated aliphatic groups:

(2) in the presence of an unsaturated aliphatic groups, for example vinyl:

Therefore, in the procedure of U.S. Pat. No. 3,892,583, a release of ammonia takes place as shown in example 5 of that patent. Conversely, this release of ammonia does not occur in the use of the process of the present invention at a temperature below 220° C. A release of hydrogen, however, does occur during the present process especially in the absence of unsaturated aliphatic groups.

While particular embodiments of the invention have been described, it will be understood that the invention is not so limited since many modifications and variations could be made without departing from the spirit or scope of the invention.

What is claimed is:

1. A process for the treatment of a polysilazane comprising the step of thermally treating at least one polysilazane at a temperature of from about 40° C. to 220° C., the polysilazane comprising on average at least two ≡SiH groups and at least two

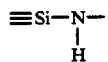

groups per molecule.

2. The process of claim 1, wherein the polysilazane has at least three ≡SiH groups per molecule.

3. The process of claim 1, wherein said at least one polysilazane is thermally treated along with a second polysilazane free of ≡SiH groups but containing unsaturated aliphatic hydrocarbon groups bonded to the silicon atom.

4. The process of claim 3, wherein the molar ratio of SiH groups to the unsaturated aliphatic hydrocarbon groups is from about 0.5 to 5.

5. The process of claim 4, wherein the molar ratio is from 0.8 to 2.

6. The process of claim 1, wherein the thermal treatment is conducted at a temperature from about 100° C. to 220° C.

7. The process of claim 6, wherein the polysilazane has at least three ≡SiH groups per molecule.

8. The process of claim 1, wherein the thermal treatment is conducted for a time from about 1 minute to 24 hours.

9. The process of claim 1, wherein the thermal treatment is carried out at a pressure greater than atmospheric pressure.

10. The process of claim 1, wherein the thermal treatment is carried out at atmospheric pressure.

11. The process of claim 1, wherein the thermal treatment is carried out at a pressure less than atmospheric pressure.

12. The process of claim 1, wherein the thermal treatment is carried out in an inert atmosphere.

13. The process of claim 1, wherein the polysilazane has a viscosity from about 10 mPas to 5000 mPas at 25° C.

14. The process of claim 12, wherein the viscosity is from 100 mPas to 1000 mPas.

15. The process of claim 1, wherein the thermal treatment is carried out in an organic solvent solution.

16. The process of claim 1, wherein the thermal treatment is carried out in the absence of a solvent.

17. The process of claim 1, wherein said polysilazane also contains unsaturated aliphatic hydrocarbon groups bonded to the silicon atoms.

18. The process of claim 17, wherein the molar ratio of SiH groups to the unsaturated aliphatic hydrocarbon groups is from about 0.5 to 5.

19. A polysilazane produced by the process of claim 1.

* * * * *